United States Patent
Molnar et al.

(10) Patent No.: US 10,425,767 B1
(45) Date of Patent: Sep. 24, 2019

(54) DETERMINING PROPERTIES ASSOCIATED WITH SIGNAL SOURCES

(71) Applicant: shopkick, Inc., Redwood City, CA (US)

(72) Inventors: Joseph Reginald Scott Molnar, Menlo Park, CA (US); Todd Sean Murchison, Santa Clara, CA (US); Vivek Shrivastava, San Francisco, CA (US); Asher Blum, Redwood City, CA (US)

(73) Assignee: shopkick, Inc., Redwood City, CA (US)

( * ) Notice: Subject to any disclaimer, the term of this patent is extended or adjusted under 35 U.S.C. 154(b) by 0 days.

(21) Appl. No.: 15/941,966

(22) Filed: Mar. 30, 2018

(51) Int. Cl.
*H04W 4/021* (2018.01)
*H04W 4/80* (2018.01)
*H04W 4/23* (2018.01)
*H04W 4/33* (2018.01)
*H04W 4/02* (2018.01)

(52) U.S. Cl.
CPC .......... *H04W 4/021* (2013.01); *H04W 4/025* (2013.01); *H04W 4/23* (2018.02); *H04W 4/33* (2018.02); *H04W 4/80* (2018.02)

(58) Field of Classification Search
CPC ....... H04W 4/21; H04W 76/021; H04W 4/02; H04W 4/021
See application file for complete search history.

(56) References Cited

U.S. PATENT DOCUMENTS

| | | | |
|---|---|---|---|
| 2015/0050947 A1* | 2/2015 | Wirola | G01S 5/0252 455/456.1 |
| 2016/0128121 A1* | 5/2016 | Koriyama | G08C 17/02 455/41.2 |
| 2017/0276797 A1* | 9/2017 | Hsieh | G01C 21/14 |

* cited by examiner

*Primary Examiner* — Myron Wyche
(74) *Attorney, Agent, or Firm* — Van Pelt, Yi & James LLP

(57) ABSTRACT

Determining properties associated with signal sources based on measured or observed signal values detected at devices are disclosed. Specifically, a value associated with a signal detected at a device is determined. Based on a type of the device, the determined value is transformed into a normalized value with respect to a reference value determined for a reference device. A property of the device with respect to a source of the signal is determined based at least in part on the normalized value. For example, the determined property may comprise a presence, position, location, distance, motion, rotation, etc., of the device with respect to the source of the signal.

54 Claims, 5 Drawing Sheets

DETERMINING PROPERTIES ASSOCIATED WITH SIGNAL SOURCES

BACKGROUND OF THE INVENTION

Existing presence and location detection techniques fail to provide relevant information about properties associated with a signal source whose signal is employed for presence and location detection of a device that detects the signal. Thus, there exists a need for improvements in such techniques as disclosed herein.

BRIEF DESCRIPTION OF THE DRAWINGS

Various embodiments of the invention are disclosed in the following detailed description and the accompanying drawings.

DETAILED DESCRIPTION

Figure 1:
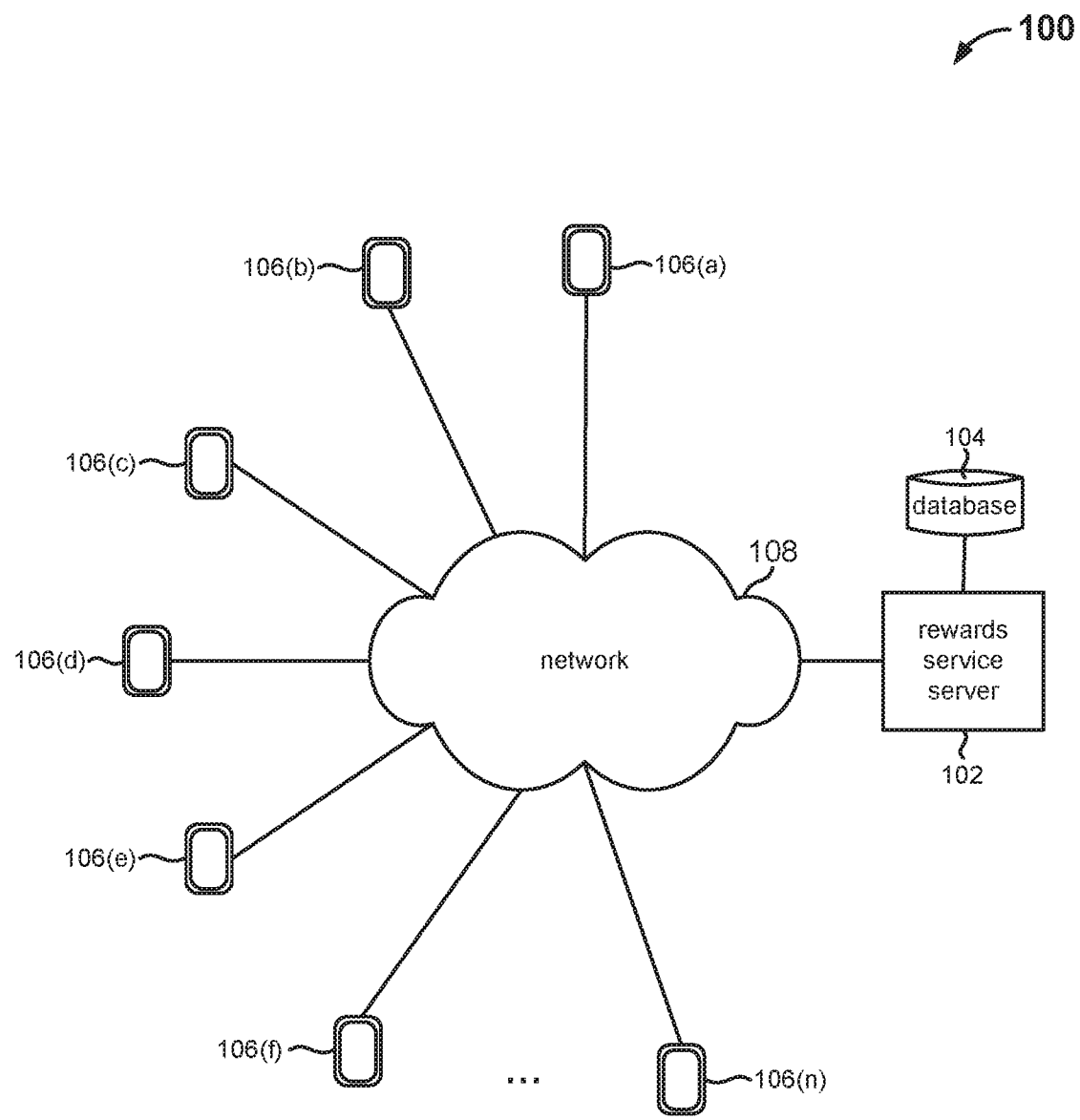
FIG. 1 is a high level block diagram illustrating an embodiment of a network environment in which a rewards service is provided.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications, and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

A variety of applications and application features exist that are based at least in part on reliable presence or location detection. Knowledge of a current absolute or relative position of a user or device, for example, at or within a geographical area or venue such as a store, may be employed with respect to various contexts, such as facilitating provisioning of content relevant to the area or venue at which presence is detected or issuing an offer or reward in exchange for presence.

An example application that at least in part is based on determining or detecting user presence or location comprises a rewards service application that facilitates provisioning of offers or rewards on behalf of various entities to users in response to various user actions. For instance, rewards such as an award of redeemable points, an offer of an otherwise unavailable discount or promotion, a gift card or certificate, a monetary value, etc., may be provided in response to user actions such as a check-in, walk-in, store or department visit, product or other barcode scan, purchase, etc. In some embodiments, such rewards for prescribed user actions are dynamically and automatically provided to users in real-time, for example, as or when the user engages in or completes one or more requisite actions for earning the rewards. In some such cases, knowledge of exact or estimated absolute or relative user position may determine whether a user qualifies for a location-based reward.

FIG. 1 is a high level block diagram illustrating an embodiment of a network environment 100 in which a rewards service is provided. The rewards service comprises client and server components. In one embodiment, the rewards service comprises a mobile application that communicates with a server application. In another embodiment, the rewards service comprises a web application which may communicate with mobile devices via SMS (Short Message Service) or push notifications.

In the given example, the rewards service is developed, distributed, and/or managed by the entity comprising server 102. Although depicted as a single block in FIG. 1, rewards service server 102 may comprise any number of possibly networked components. For example, server 102 may be a part of a server farm. Information associated with available rewards and corresponding rules for earning available rewards, partners (e.g., entities providing the rewards, entities from which data needed for determining rewards is obtained, etc.), as well as the users of the rewards service is stored in one or more databases such as database 104. In some embodiments, a unique user account is associated with each user of the rewards service.

The rewards service is available to users of each of a plurality of devices 106. In some embodiments, a client-side application is installed on a device 106. For instance, a client-side rewards service application may be downloaded from server 102 or another application repository and installed on a device 106. Alternatively, a device 106 may access a rewards service application published by server 102 via a web interface. In FIG. 1, devices 106 are depicted as cellular or mobile phones. However, generally, a device 106 may comprise any other computing device that is capable of communicating with server 102, such as a personal or enterprise digital assistant, tablet computer, laptop computer, etc.

A typical device 106 comprises a microprocessor, a memory coupled to the microprocessor providing both code that the microprocessor executes and data under the control of the microprocessor, a display (e.g., a touch-sensitive display) through which a user may view and interact with user interface elements, a microphone, a cellular transceiver, a WiFi transceiver, a Bluetooth and/or BLE (Bluetooth Low Energy) transceiver, GPS (Global Positioning System) sensors, an accelerometer, a gyroscope, a magnetometer, and various other components. When a device 106 performs a task, the microprocessor of the device 106 performs applicable operations according to relevant code/data stored in its associated memory and interactions with other components within the device 106, as necessary, to perform the task.

As depicted, communication between server 102 and devices 106 is facilitated via network 108. In various embodiments, network 108 may comprise any combination of one or more public, private, wired, and/or wireless networks, such as a cellular/mobile network or the Internet. Example communications between server 102 and devices 106 may include, for instance, the download of a client-side application from server 102 at a device 106; the communication of user information, preferences, and/or selections from a device 106 to server 102, some of which may be stored in database 104, for example, with respect to an associated user account; the communication of available offers or rewards by server 102 to a device 106 for display at and consideration by a user of the device; the communication of occurrences of user actions that facilitate qualifying for various offers or rewards from a device 106 to server 102; notifications by server 102 of earned rewards or remaining user actions that need to be completed to earn available rewards to a user of a device 106; redemption of an available offer or earned reward by a user of a device 106 via server 102; etc.

The rewards service described with respect to FIG. 1 is merely one example of an application that may at least in part be based on current user location or presence at or within a venue such as a store. The disclosed presence/location detection techniques may generally be employed with respect to any other application that uses presence/location information at one or more levels of granularity, such as within a geographical region, at a venue, at a specific place within a venue (e.g., at a department or near a display at a store), etc.

Figure 2:
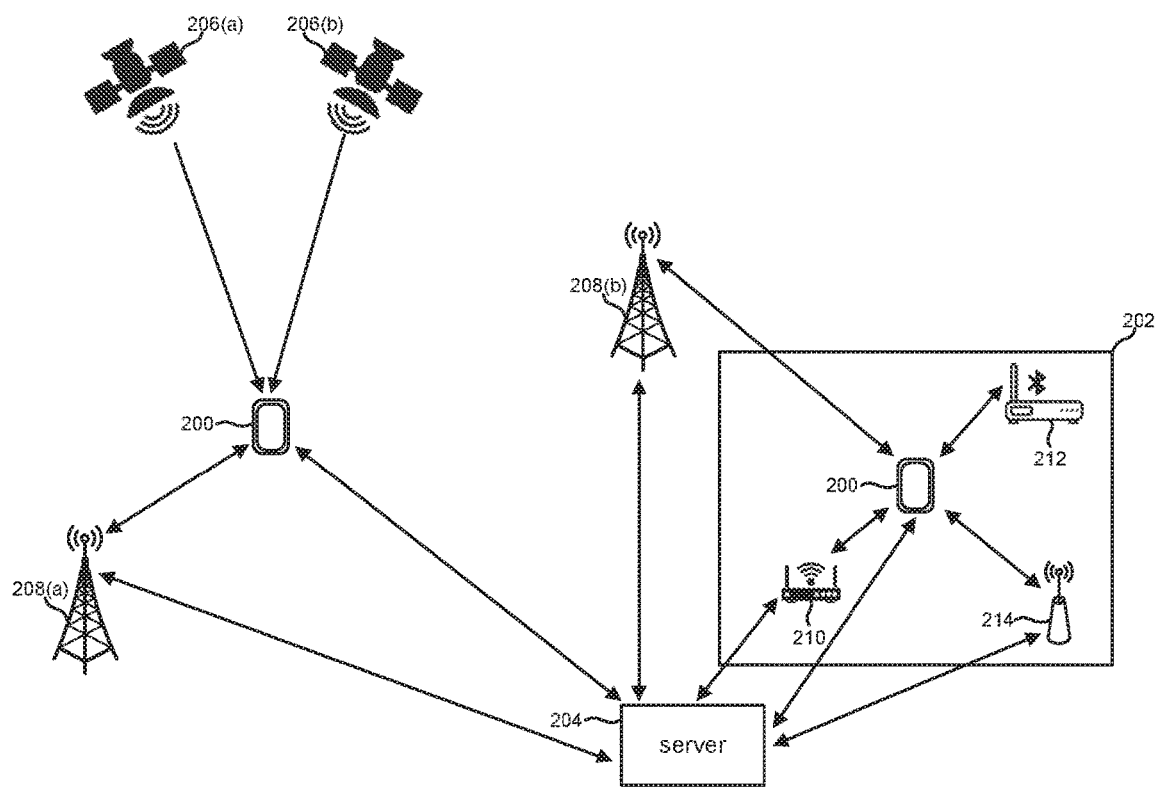
FIG. 2 is a high level block diagram illustrating example technologies that may be employed to determine, estimate, or track current device/user location or position.

FIG. 2 is a high level block diagram illustrating example technologies that may be employed to determine, estimate, or track current device/user location or position. For instance, such technologies may be employed by applications that rely on presence detection, such as the rewards service described with respect to FIG. 1. One or more of the systems illustrated in FIG. 2 may be used with a device 200 (e.g., which may comprise any of devices 106 of FIG. 1) when it is outdoors or indoors within a building 202. Moreover, one or more systems may independently be in communication with an associated server 204 (e.g., which may comprise server 102 of FIG. 1).

As depicted in FIG. 2, example technologies include GPS (Global Positioning System) 206, cellular network 208, WiFi (wireless local area network) 210, Bluetooth and/or BLE (Bluetooth Low Energy) 212, and sound transmitter 214 configured to transmit a (e.g., ultrasonic) sound signal. GPS 206 may be employed to identify device 200 locations in outdoor areas or environments while cellular network 208 may be employed for triangulation or trilateration of device 200 in both outdoor and indoor contexts. Entry or presence of device 200 inside building 202 may be detected via a venue identifier determined from or encoded within WiFi 210 communications (e.g., from an identifier such as an SSID (Service Set IDentifier) broadcast by WiFi network 210), Bluetooth or BLE 212 communications (e.g., an associated service identifier or service parameter), and/or the sound signal transmitted by sound transmitter 214. Such a venue identifier may be communicated to and/or decoded by server 204 to determine or infer presence at a corresponding venue or part thereof. In some cases, a plurality of access points, beacons, and/or transmitters may be deployed throughout building 202, for example, so that more specific locations or positions of device 200 within building 202 (e.g., floors, departments, aisles, etc., within a store) may be determined.

In addition to and/or instead of one or more of the example systems illustrated in FIG. 2, other available technologies may be employed to determine device presence or location. For instance, a venue identifier may be communicated to device 200 via short range RF (radio frequency) such as RFID (radio-frequency identification) and/or barcodes. Presence of device 200 within an area covered by WiFi network 210 may be determined based on device identifier recognition such as device 200 MAC (Media Access Control) address detection at WiFi device 210, e.g., when device 200 sends a probe request. Furthermore, magnetic field variations detected by a magnetometer of device 200 and/or detection of at least a portion to a magnetic field fingerprint or blueprint of a prescribed building may be employed to determine presence within the prescribed building or a part thereof. Moreover, other sensors such as an accelerometer and/or a gyroscope may be employed to detect motion and/or tilting of device 200. Generally, any one or more available technologies may be employed in determining presence/location of device 200.

Each potential technology or system that may be employed for presence detection or location identification comprises a signal source and requires corresponding software and hardware components (e.g., applicable signal transceivers or sensors) to be available and activated on device 200. A signal source may comprise an external signal source or an internal signal source (e.g., a sensor) of device 200. That is, in some cases, device 200 or a component thereof comprises a signal source itself. A device 200 that detects or receives a signal from a prescribed signal source observes data such as signal values, signal strength, SNR (signal-to-noise ratio), and/or other signal characteristics, attributes, or properties. A signal from a prescribed signal source may be employed independently or in concert or combination, either serially or in parallel, with signals from one or more other signal sources to determine, estimate, or infer device presence or location. Different signal sources may facilitate determining location or position information having different degrees or levels of granularity. Each technology employed as well as associated communications consume device power. Thus, sensors and/or receivers for various signals may not all be always available at device 200 and may sometimes be automatically or manually de-activated, e.g., during low power states of device 200.

Signals detected and/or received at device 200 from one or more signal sources and/or values derived or decoded therefrom may be employed to make various decisions, such as decisions related to determining or estimating an absolute or relative position or simply presence of device 200 at or within a location such as building 202. In some cases, for example, values associated with detected or received signals may be compared with respect to corresponding thresholds or reference values when making such decisions. However, actual measured or observed signal values or characteristics at a device depend on the specific hardware and/or software components comprising the device and may vary for different units of the same type of device due to implementation variations. Moreover, different types (e.g., manufacturers, makes, models, versions) of devices may observe or measure significantly different values or characteristics for the same signals.

Thus, there exists a need to account for differences in detected or received signals or values derived therefrom at different devices. One technique for accounting for such device variations comprises determining and using different decision making thresholds or reference values for different types of devices. Another technique comprises normalizing signals detected or received at a prescribed type of device with respect to baseline or reference values determined for a nominal or reference device that may be of a different type. In such cases, correction or compensation factors (e.g., coefficients, scalars, vectors, offsets, weights, multipliers, etc.) and/or functions for normalization with respect to reference values may be based on empirically determined differences between the prescribed device type and the reference device type.

Figure 3:
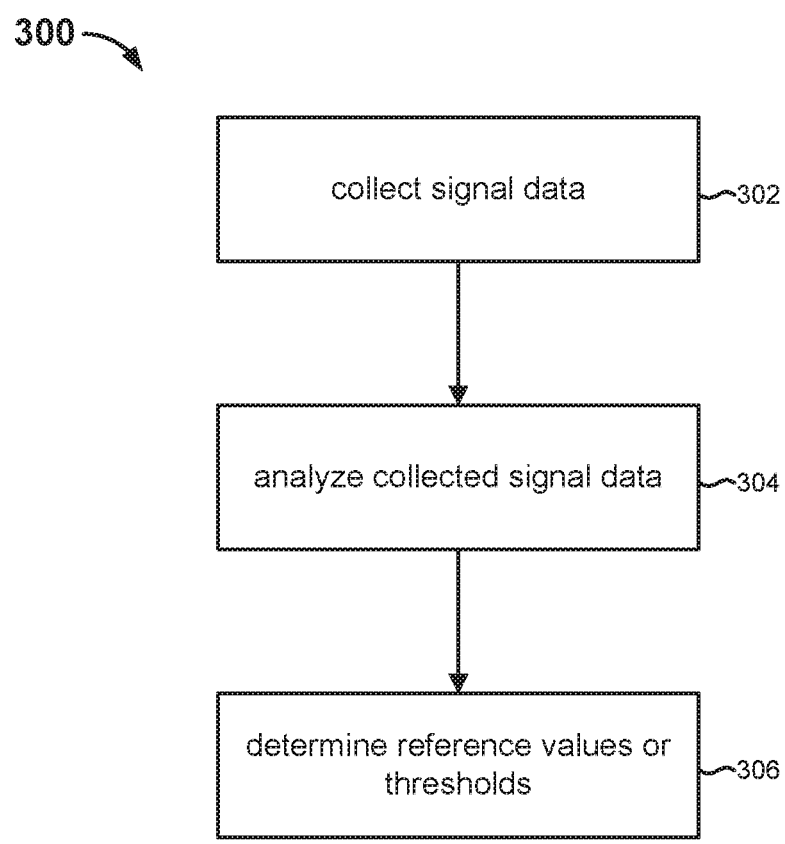
FIG. 3 is a high level flow chart illustrating an embodiment of a process for determining reference values.

FIG. 3 is a high level flow chart illustrating an embodiment of a process for determining reference values. For example, process 300 of FIG. 3 may be employed to determine thresholds employed with respect to presence/location detection decisions. As described, values associated with signals detected or received at a device (e.g., device 106 of FIG. 1 or device 200 of FIG. 2) may in some cases be compared with respect to such thresholds or reference values to determine presence or location information about the device. Process 300 may be iterated for different types of signals and associated signal sources, types of devices, and/or types of thresholds or reference values.

Process 300 starts at step 302 at which signal data is collected. More specifically, step 302 comprises collecting detected or received signal values or characteristics measured or observed at a device (e.g., a device such as device 106 of FIG. 1 or device 200 of FIG. 2) for a signal originating from a prescribed signal source, which may comprise an external signal source or a sensor or other internal signal source of the device. As further described below, in various embodiments, signal data may be collected at step 302 with respect to a reference device of a prescribed type or with respect to reference devices of a plurality of types. Moreover, collected signal data may at least in part be crowd sourced, e.g., from users of an application such as devices 106 of the rewards service application described with respect to FIG. 1. At step 304, the signal data collected at step 302 is analyzed. In some embodiments, step 304 includes deriving or decoding relevant values from collected signal data. The analysis of step 304, for example, may comprise determining an average across a plurality of samples. At step 306, one or more associated reference values or thresholds for a given signal under consideration are determined from the analysis of the collected signal data.

In some embodiments, a reference value or threshold determined using process 300 for a signal from a particular signal source is for a prescribed property associated with that signal source, such as presence, position, distance, etc., with respect to the signal source. For example, a value associated with a received signal may be compared to one or more corresponding thresholds or reference values to determine or infer presence of a device that receives the signal in the vicinity of the corresponding signal source, and, in turn, at or within a location such as building 202 of FIG. 2 in which that signal source is located. As another example, a value associated with a received signal may be compared to one or more corresponding thresholds or reference values to determine or estimate a position of a device that receives the signal relative to the corresponding signal source, which may be indicated with respect to areas of a building in which the signal source is located, such as at or near an entrance/exit, a product or other display, an aisle or department, a floor of a multistory building, a point-of-sale or check-out area, etc. As yet another example, a value associated with a received signal may be compared to one or more corresponding thresholds or reference values to determine or estimate a distance of a device that receives the signal from the corresponding source of the signal. In some embodiments, a device itself or one or more sensors thereof (e.g., accelerometer, gyroscope, magnetometer, etc.) comprises a signal source, and detected or sensed values may be compared to one or more corresponding thresholds or reference values to determine an associated property such as motion of the device, tilt or rotation of the device, magnetic field variations or perturbations at the device location, etc.

In some embodiments, process 300 is employed to determine reference values or thresholds with respect to a reference device of a prescribed type. In some such cases, the determined reference values or thresholds may be employed with respect to other devices of the same or different type. For example, an Apple iPhone X may be used as a benchmark with respect to process 300, and reference values or thresholds determined with respect to this phone may be employed with respect to other phones of the same or different type, such as other Apple iPhones, Google Pixel phones, Samsung Galaxy phones, etc. However, as further described with respect to process 400 of FIG. 4, received or detected signal values at other devices of different types may need to be normalized so that the same baseline or reference values determined using a particular device type can be used across different types of devices.

Alternatively, process 300 may be employed to determine reference values or thresholds with respect to reference devices of a plurality of different types. In such cases, reference values or thresholds determined with respect to a prescribed type of device are employed for devices of that type. For example, a prescribed Apple iPhone model may be used as a benchmark with respect to process 300 to determine reference values or thresholds generally employed for Apple phones, a prescribed Google Pixel phone model may be used as a benchmark with respect to process 300 to determine reference values or thresholds generally employed for Google phones, a prescribed Samsung phone model may be used as a benchmark with respect to process 300 to determine reference values or thresholds generally employed for Samsung phones, etc. Thus, different reference values or thresholds may be determined and employed for different types of devices as further described with respect to process 500 of FIG. 5. Although the given example describes determining different reference values or thresholds for different manufacturers, different reference values or thresholds may similarly be determined and employed for different models or versions of devices of a given manufacturer.

In some embodiments, process 300 is employed with respect to one or more dedicated reference devices whose properties (e.g., presence, position, location, distance, motion, tilt/rotation, magnetic field, etc.) are foreknown and received or detected signal data is deliberately collected and analyzed so that reference values or thresholds can be determined for the properties. In some embodiments, the reference values or thresholds determined using process 300 are at least in part based on crowed sourced data from a plurality of devices of one or more different types. In such cases, received or detected signal data collected from a large number of users or associated devices may be employed to dynamically and automatically determine or adjust reference values or thresholds.

Presence or location information about a device using an application such as the rewards service application described with respect to FIG. 1 may be known or inferred based on various user actions with respect to the application. For example, an application may incentivize users for opening, running, foregrounding, and/or otherwise engaging or interacting with the application at various locations, such as at the entrance of a store (which may directly be known if users perform walk-in or check-in actions), at various areas within a store such as near specific product or other displays (e.g., which may at least in part be determined when users perform scan actions when scanning particular products or available barcodes or detect other identifiers such as using RFID), at point-of-sale terminals or check-out areas (e.g., which may be determined when users perform purchase actions), etc. Such known or inferred/estimated location data of user devices may be used in conjunction with received or detected signal data at the devices to determine or adjust reference values or thresholds based on actual user data from many devices over time. Thus, a self-correcting, self-evolving architecture is feasible using crowd sourced data.

Figure 4:
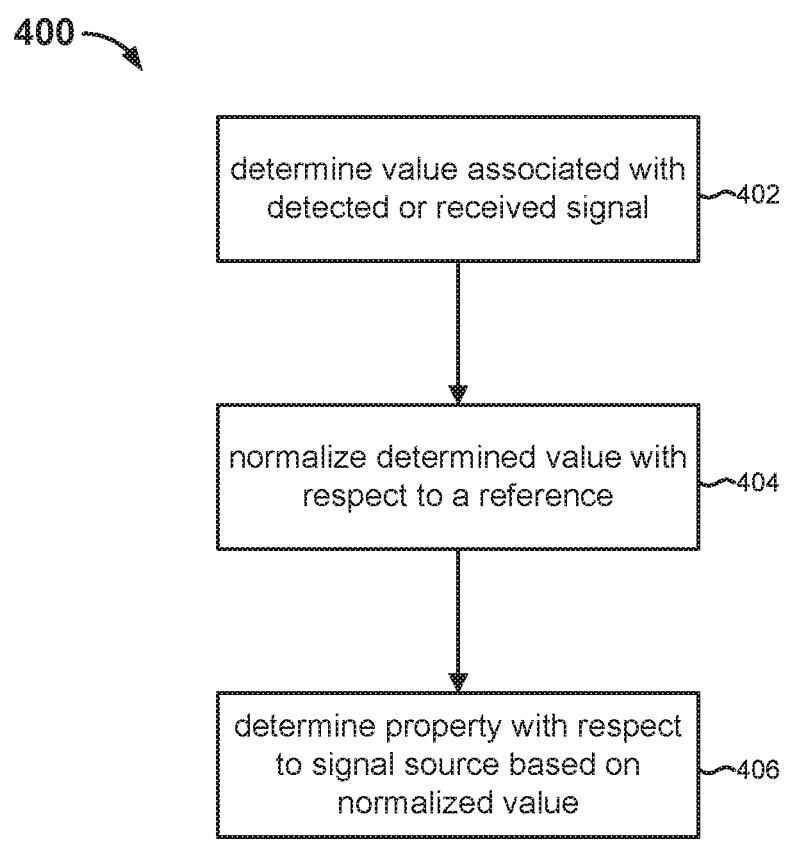
FIG. 4 is a high level flow chart illustrating an embodiment of a process for determining a property associated with a source of a signal with respect to a device at which the signal is detected or received.

FIG. 4 is a high level flow chart illustrating an embodiment of a process for determining a property associated with a source of a signal with respect to a device at which the signal is detected or received. In the cases in which the device itself comprises the signal source, the property is associated with the device. Process 400 of FIG. 4 may be employed, for example, at device 106 of FIG. 1 or device 200 of FIG. 2. Alternatively, a device such as device 106 of FIG. 1 or device 200 of FIG. 2 may detect or receive and/or pre-process a signal from a signal source, and a property associated with the source of the signal may at least in part be determined at an associated server such as server 102 of FIG. 1 or server 204 of FIG. 2. Process 400 may be iterated to determine any number of properties with respect to one or more signal sources.

Process 400 starts at step 402 at which a value associated with a detected or received signal is determined. A detected or received signal comprises actual measured or observed values or other signal characteristics at a device that detects or receives the signal, which may depend on device implementation. That is, different devices of the same type and different types of devices may detect different measured or observed values or characteristics for the same signal. In various embodiments, the value determined at step 402 may comprise an actually observed detected or received signal value or characteristic or alternatively may comprise a value that is derived or decoded from a detected or received signal.

At step 404, the value determined at step 402 is normalized with respect to a reference. For example, the value determined at step 402 is normalized with respect to a reference value determined for a reference device. In some cases, the reference value is determined (e.g., using process 300 of FIG. 3) with respect to a nominal or reference device that is of a different type than the device that detects or receives the signal. The normalization of step 404 is based on the type of the device that detects or receives the signal. Thus, normalization accounts for differences in signal detection or reception at the device that detects or receives the signal and the reference device with respect to which the reference value is determined and, in some cases, is based on empirically determined differences between the type of the device that detects or receives the signal and the reference device type and/or properties with respect to a signal source thereof. In various embodiments, normalization may comprise one or more associated correction or compensation factors, coefficients, offsets, weights, multipliers, scalars, vectors, etc., and/or normalization functions. The normalization of step 404 may not be necessary for devices that are of a same type as the reference device.

At step 406, a property is determined based on the normalized value determined at step 404. For example, the property determined at step 406 may at least in part indicate a presence, position, location, distance, motion, rotation, magnetic field, etc., of the device that detects or receives the signal, e.g., with respect to the source of the signal. Step 406 may include comparing the normalized value determined at step 404 with respect to the reference value of step 404 and/or an associated threshold to determine the property at step 406.

As an example, a source of a signal may comprise a signal transmitter, e.g., that transmits via Bluetooth, BLE, sound, etc., and a determined property may comprise presence within the vicinity of or an area surrounding or covered by the signal transmitter and/or an absolute or relative position or distance from the signal transmitter, which may be determined, for instance, based on a received signal value (e.g., signal strength) or a value derived therefrom. As another example, a source of a signal may comprise a WiFi transceiver, and a determined property may comprise presence of a device that receives the signal in an area covered by the WiFi transceiver, e.g., based on the WiFi signature or access points detected by the device. As yet another example, a source of a signal may comprise a device magnetometer, the signal may comprise magnetic field variations resulting from the (e.g., metal) structure of a building, and the determined property may comprise the exact or estimated location or position of the device that detects the magnetic field within the building based on, for instance, a known magnetic field fingerprint of the building.

Figure 5:
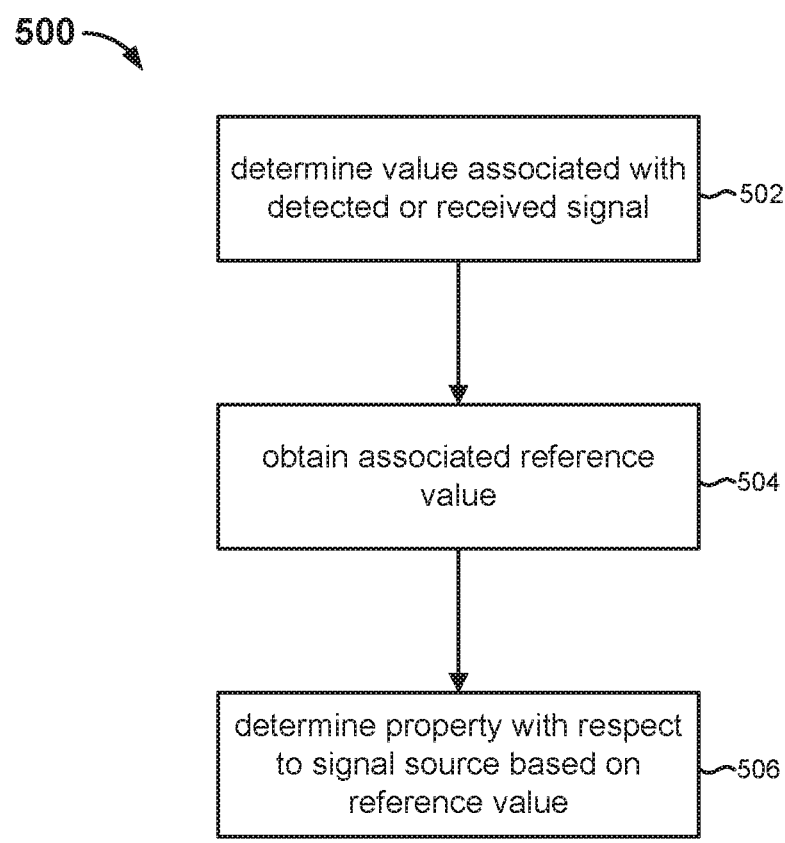
FIG. 5 is a high level flow chart illustrating an embodiment of a process for determining a property associated with a source of a signal with respect to a device at which the signal is detected or received.

FIG. 5 is a high level flow chart illustrating an embodiment of a process for determining a property associated with a source of a signal with respect to a device at which the signal is detected or received. In the cases in which the device itself comprises the signal source, the property is associated with the device. Process 500 of FIG. 5 may be employed, for example, at device 106 of FIG. 1 or device 200 of FIG. 2. Alternatively, a device such as device 106 of FIG. 1 or device 200 of FIG. 2 may detect or receive and/or pre-process a signal from a signal source, and a property associated with the source of the signal may at least in part be determined at an associated server such as server 102 of FIG. 1 or server 204 of FIG. 2. Process 500 may be iterated to determine any number of properties with respect to one or more signal sources.

Process 500 starts at step 502 at which a value associated with a detected or received signal is determined. A detected or received signal comprises actual measured or observed values or other signal characteristics at a device that detects or receives the signal, which may depend on device implementation. That is, different devices of the same type and different types of devices may detect different measured or observed values or characteristics for the same signal. In various embodiments, the value determined at step 502 may comprise an actually observed detected or received signal value or characteristic or alternatively may comprise a value that is derived or decoded from a detected or received signal.

At step 504, an associated reference value or threshold is obtained. The obtained reference value or threshold is associated with the type of the device that detects or receives the signal and in various embodiments may be available at the device or from a corresponding server. In many cases, step 504 comprises a simple lookup operation based on the type of the device that detects or receives the signal as well as the type of the detected or received signal. In some cases, step 504 may comprise an update of available lookup tables at a device, e.g., from an associated server that publishes the tables in the event that the needed reference value or threshold is not current or already available at the device. Since a specific reference value or threshold for a prescribed type of device is obtained at step 504, normalization of the value determined at step 502 is not necessary as at step 404 of process 400 of FIG. 4.

At step 506, a property is determined with respect to the signal source. In some cases, step 506 includes comparing the value determined at step 502 with respect to the reference value or threshold obtained at step 504 to determine the property at step 506. As previously described, the property determined at step 506 may at least in part indicate a presence, position, location, distance, motion, rotation, magnetic field, etc., of the device that detects or receives the signal, e.g., with respect to the source of the signal.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   determining a value associated with a signal detected at a device;
   based on a type of the device, normalizing the determined value to a normalized value with respect to a reference value determined for a reference device that is of a different type than the type of the device at which the signal is detected; and
   determining a property of the device with respect to a source of the signal based at least in part on the normalized value.

2. The method of claim 1, wherein the property at least in part indicates a presence of the device in an area surrounding or covered by the source of the signal.

3. The method of claim 1, wherein the property at least in part indicates a position or location of the device with respect to the source of the signal.

4. The method of claim 1, wherein the property at least in part indicates a position of the device with respect to a building in which the source of the signal is located.

5. The method of claim 1, wherein the property at least in part indicates a distance of the device from the source of the signal.

6. The method of claim 1, wherein the source of the signal comprises a transmitter.

7. The method of claim 1, wherein the source of the signal communicates via sound, Bluetooth, Bluetooth Low Energy, or WiFi.

8. The method of claim 1, wherein the source of the signal comprises a magnetometer, accelerometer, or gyroscope of the device.

9. The method of claim 1, wherein the device and the source are both located indoors.

10. The method of claim 1, wherein different devices detect different values for the same signal from the source.

11. The method of claim 1, wherein the determined value associated with the signal comprises a measured or observed value of the signal at the device.

12. The method of claim 1, wherein the determined value associated with the signal comprises a value that is derived or decoded from the signal.

13. The method of claim 1, wherein the type of the device comprises either or both a manufacturer and a model of the device.

14. The method of claim 1, wherein determining the property comprises comparing the normalized value with respect to a threshold associated with the property.

15. The method of claim 1, wherein normalizing is based on an empirically determined difference between the type of the device and the type of the reference device with respect to the property.

16. The method of claim 1, wherein the reference value is determined or adjusted using crowd sourced data.

17. The method of claim 1, wherein the property is determined based at least in part on one or more actions by a user of the device with respect to an application on the device.

18. The method of claim 1, wherein the device comprises a mobile device.

19. A system, comprising:
   a processor configured to:
      determine a value associated with a signal detected at a device;
      based on a type of the device, normalize the determined value to a normalized value with respect to a reference value determined for a reference device that is of a different type than the type of the device at which the signal is detected; and
      determine a property of the device with respect to a source of the signal based at least in part on the normalized value; and
   a memory coupled to the processor and configured to provide the processor with instructions.

20. A computer program product embodied in a non-transitory computer readable storage medium and comprising computer instructions for:
   determining a value associated with a signal detected at a device;
   based on a type of the device, normalizing the determined value to a normalized value with respect to a reference value determined for a reference device that is of a different type than the type of the device at which the signal is detected; and
   determining a property of the device with respect to a source of the signal based at least in part on the normalized value.

21. The system of claim 19, wherein the property at least in part indicates a presence of the device in an area surrounding or covered by the source of the signal.

22. The system of claim 19, wherein the property at least in part indicates a position or location of the device with respect to the source of the signal.

23. The system of claim 19, wherein the property at least in part indicates a position of the device with respect to a building in which the source of the signal is located.

24. The system of claim 19, wherein the property at least in part indicates a distance of the device from the source of the signal.

25. The system of claim 19, wherein the source of the signal comprises a transmitter.

26. The system of claim 19, wherein the source of the signal communicates via sound, Bluetooth, Bluetooth Low Energy, or WiFi.

27. The system of claim 19, wherein the source of the signal comprises a magnetometer, accelerometer, or gyroscope of the device.

28. The system of claim 19, wherein the device and the source are both located indoors.

29. The system of claim 19, wherein different devices detect different values for the same signal from the source.

30. The system of claim 19, wherein the determined value associated with the signal comprises a measured or observed value of the signal at the device.

31. The system of claim 19, wherein the determined value associated with the signal comprises a value that is derived or decoded from the signal.

32. The system of claim 19, wherein the type of the device comprises either or both a manufacturer and a model of the device.

33. The system of claim 19, wherein to determine the property comprises to compare the normalized value with respect to a threshold associated with the property.

34. The system of claim 19, wherein to normalize is based on an empirically determined difference between the type of the device and the type of the reference device with respect to the property.

35. The system of claim 19, wherein the reference value is determined or adjusted using crowd sourced data.

36. The system of claim 19, wherein the property is determined based at least in part on one or more actions by a user of the device with respect to an application on the device.

37. The system of claim 19, wherein the device comprises a mobile device.

38. The computer program product of claim 20, wherein the property at least in part indicates a presence of the device in an area surrounding or covered by the source of the signal.

39. The computer program product of claim 20, wherein the property at least in part indicates a position or location of the device with respect to the source of the signal.

40. The computer program product of claim 20, wherein the property at least in part indicates a position of the device with respect to a building in which the source of the signal is located.

41. The computer program product of claim 20, wherein the property at least in part indicates a distance of the device from the source of the signal.

42. The computer program product of claim 20, wherein the source of the signal comprises a transmitter.

43. The computer program product of claim 20, wherein the source of the signal communicates via sound, Bluetooth, Bluetooth Low Energy, or WiFi.

44. The computer program product of claim 20, wherein the source of the signal comprises a magnetometer, accelerometer, or gyroscope of the device.

45. The computer program product of claim 20, wherein the device and the source are both located indoors.

46. The computer program product of claim 20, wherein different devices detect different values for the same signal from the source.

47. The computer program product of claim 20, wherein the determined value associated with the signal comprises a measured or observed value of the signal at the device.

48. The computer program product of claim 20, wherein the determined value associated with the signal comprises a value that is derived or decoded from the signal.

49. The computer program product of claim 20, wherein the type of the device comprises either or both a manufacturer and a model of the device.

50. The computer program product of claim 20, wherein determining the property comprises comparing the normalized value with respect to a threshold associated with the property.

51. The computer program product of claim 20, wherein normalizing is based on an empirically determined difference between the type of the device and the type of the reference device with respect to the property.

52. The computer program product of claim 20, wherein the reference value is determined or adjusted using crowd sourced data.

53. The computer program product of claim 20, wherein the property is determined based at least in part on one or more actions by a user of the device with respect to an application on the device.

54. The computer program product of claim 20, wherein the device comprises a mobile device.

* * * * *